United States Patent
Baluja et al.

(10) Patent No.: US 8,386,914 B2
(45) Date of Patent: *Feb. 26, 2013

(54) ENHANCED DOCUMENT BROWSING WITH AUTOMATICALLY GENERATED LINKS TO RELEVANT INFORMATION

(75) Inventors: Shumeet Baluja, Mountain View, CA (US); Vibhu Mittal, Sunnyvale, CA (US); Mehran Sahami, Redwood City, CA (US)

(73) Assignee: Google Inc., Mountain View, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 12/710,480

(22) Filed: Feb. 23, 2010

(65) Prior Publication Data
US 2010/0153422 A1   Jun. 17, 2010

Related U.S. Application Data

(63) Continuation of application No. 10/887,443, filed on Jun. 30, 2004, now Pat. No. 7,698,626.

(51) Int. Cl.
G06F 17/00 (2006.01)
G06F 17/20 (2006.01)
G06F 17/21 (2006.01)
G06F 17/24 (2006.01)
G06F 17/30 (2006.01)

(52) U.S. Cl. ........ 715/205; 715/201; 715/206; 715/207; 715/208; 715/255; 707/728; 707/730

(58) Field of Classification Search .......... 715/205–208, 715/255, 201; 707/1, 3, 6, 728, 730
See application file for complete search history.

(56) References Cited

U.S. PATENT DOCUMENTS

| 5,796,952 | A | | 8/1998 | Davis et al. |
| 6,122,647 | A | * | 9/2000 | Horowitz et al. ............. 715/205 |
| 6,134,532 | A | | 10/2000 | Lazarus et al. |
| 6,169,986 | B1 | | 1/2001 | Bowman et al. |
| 6,256,633 | B1 | | 7/2001 | Dharap |
| 6,513,031 | B1 | * | 1/2003 | Fries et al. ............................ 1/1 |
| 6,563,514 | B1 | | 5/2003 | Samar |
| 6,574,624 | B1 | | 6/2003 | Johnson et al. |
| 6,581,072 | B1 | | 6/2003 | Mathur et al. |

(Continued)

FOREIGN PATENT DOCUMENTS

| CN | 1471020 A | 1/2004 |
| GB | 2 368 167 | 4/2002 |

(Continued)

OTHER PUBLICATIONS

Nikkei Business Publications, Inc., "Shunsaku", Mar. 22, 2004, pp. 54-69. (Includes partial English translation).

(Continued)

*Primary Examiner* — Chau Nguyen
(74) *Attorney, Agent, or Firm* — Harrity & Harrity, LLP

(57) ABSTRACT

Additional documents are automatically located that are relevant to an original document, such as a document being read by a user, and also potentially relevant to personal information of the user. The additional documents may be located based on descriptive information that includes personal information of the user and content information of the document being read. The additional documents, or links to the additional documents, may be incorporated into the document being read. In some implementations, the additional documents may be presented in-line with the document being read, such as through an in-link link or text snippet. The user can thus be efficiently presented with additional information that is relevant to the original document being read.

20 Claims, 8 Drawing Sheets

U.S. PATENT DOCUMENTS

| | | | |
|---|---|---|---|
| 6,892,238 B2 | 5/2005 | Lee et al. | |
| 7,028,072 B1 | 4/2006 | Kliger et al. | |
| 7,072,888 B1 | 7/2006 | Perkins | |
| 7,089,194 B1* | 8/2006 | Berstis et al. | 705/14.54 |
| 7,127,670 B2 | 10/2006 | Bendik | |
| 7,158,986 B1 | 1/2007 | Oliver et al. | |
| 7,213,198 B1 | 5/2007 | Harik | |
| 7,305,380 B1 | 12/2007 | Hoelzle et al. | |
| 2002/0002563 A1 | 1/2002 | Bendik | |
| 2002/0138479 A1 | 9/2002 | Bates et al. | |
| 2002/0198859 A1 | 12/2002 | Singer et al. | |
| 2003/0046281 A1 | 3/2003 | Son | |
| 2003/0229677 A1* | 12/2003 | Allan | 709/217 |
| 2004/0030688 A1 | 2/2004 | Aridor et al. | |
| 2004/0059708 A1 | 3/2004 | Dean et al. | |
| 2005/0027704 A1* | 2/2005 | Hammond et al. | 707/5 |
| 2005/0060162 A1 | 3/2005 | Mohit et al. | |
| 2005/0165615 A1 | 7/2005 | Minar | |
| 2005/0222989 A1 | 10/2005 | Haveliwala et al. | |
| 2005/0278313 A1* | 12/2005 | Plow et al. | 707/3 |
| 2007/0276801 A1* | 11/2007 | Lawrence et al. | 707/3 |
| 2007/0282797 A1 | 12/2007 | Wang et al. | |
| 2008/0077558 A1 | 3/2008 | Lawrence et al. | |

FOREIGN PATENT DOCUMENTS

| | | | |
|---|---|---|---|
| JP | 09-062658 A | 3/1997 | |
| JP | 2000-057152 A | 2/2000 | |
| JP | 2001-117939 A | 4/2001 | |
| JP | 2001-282827 A | 10/2001 | |
| JP | 2001-282830 A | 10/2001 | |
| JP | 2002132782 A | 5/2002 | |
| JP | 2002157270 A | 5/2002 | |
| JP | 2002236699 A | 8/2002 | |
| JP | 2003-271669 A | 9/2003 | |
| JP | 2004-070376 A | 3/2004 | |
| JP | 2004-517402 A | 6/2004 | |
| KR | 2002-0060417 | 7/2002 | |
| KR | 2003-0079095 | 10/2003 | |
| WO | 00/43918 | 7/2000 | |
| WO | WO 00/43918 A2 | 7/2000 | |
| WO | WO 02/052441 A1 | 7/2002 | |

OTHER PUBLICATIONS

Shuwa System Co., Ltd., "Personal Computer Encyclopedia", Aug. 6, 2001, p. 6. (Includes partial English translation).

Ank Co., Ltd., "HTML Tag Dictionary", Nov. 1, 2002, pp. 146-155. (Includes partial English translation).

Nikkei Business Publications, Inc., "Digital Dictionary", Feb. 5, 2001, p. 216. (Includes partial English translation).

Google Inc. "Google!", http://webarchive.org/web/19981202230410/http://www.google.com, 1998, 1 page.

Sergey Brin et al., "The Anatomy of a Large-Scale Hypertextual Web Search Engine", Computer Science Department, Stanford University, 1998, 14 pages.

Japanese Office Action corresponding to JP 2007-519332, mailed Dec. 15, 2009, 4 pages.

Co-pending U.S. Appl. No. 10/887,443, filed Jun. 30, 2004 entitled "Enhanced Document Browsing with Automatically Generated Links to Relevant Information" by Shumeet Baluja, 37 pages.

Non-final Office Action from counterpart Korean application No. 10-2007-7001173 mailed Aug. 26, 2008 with English translation, 13 pages.

* cited by examiner

ENHANCED DOCUMENT BROWSING WITH AUTOMATICALLY GENERATED LINKS TO RELEVANT INFORMATION

RELATED APPLICATIONS

This application is a Continuation of U.S. application Ser. No. 10/887,443 filed Jun. 30, 2004, the entire disclosure of which is incorporated herein by reference.

BACKGROUND OF THE INVENTION

A. Field of the Invention

Systems and methods described herein relate generally to information retrieval and, more particularly, to techniques for browsing information.

B. Description of Related Art

The World Wide Web ("web") contains a vast amount of information. One very common use of the web is to read documents, such as news articles or other publications.

When reading a particular document, such as a news article, it is known to provide links to other documents that are somehow related to the particular document. For example, when a user selects a news document from a news search engine or an online news service, the web site may provide links to other news articles or advertisements that are related to the news document. Typically, such related documents are determined based on the content of the document being read and are shown as additional links displayed outside the content of the document. By providing convenient links to related material, these additional documents can enhance the browsing experience of the reader.

It would be desirable to provide improved techniques for enhancing document browsing by providing automatically generated links to relevant information to the reader.

SUMMARY OF THE INVENTION

According to one aspect, a method of enhancing document browsing includes receiving personal information relating to a user, generating descriptive information based on a content of a first document and the personal information, and identifying additional documents based on the descriptive information. Additionally, a second document may be generated that includes at least a portion of the content of the first document modified to include references to the additional documents.

In another aspect, a method includes locating at least one second document that is relevant to a first document and embedding the second document within the first document at a location in the first document at which the second document has relevance.

In another aspect, a method includes receiving a request for a first document from a user, identifying a named entity in the first document, locating a second document that is relevant to the named entity, and presenting a modified version of the first document to the user in which a link to the second document is displayed in-line in the first document at a location in the first document proximate to the named entity to which the second document is relevant.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

As described herein, additional documents relevant to an original document, such as a document being read by a user, are automatically located. The additional documents can be located based on their content and/or based on personal information of the user. The additional documents can be displayed in-line with the original document. The user can thus be efficiently presented with additional information that is relevant to the original document being read.

Figure 1A:
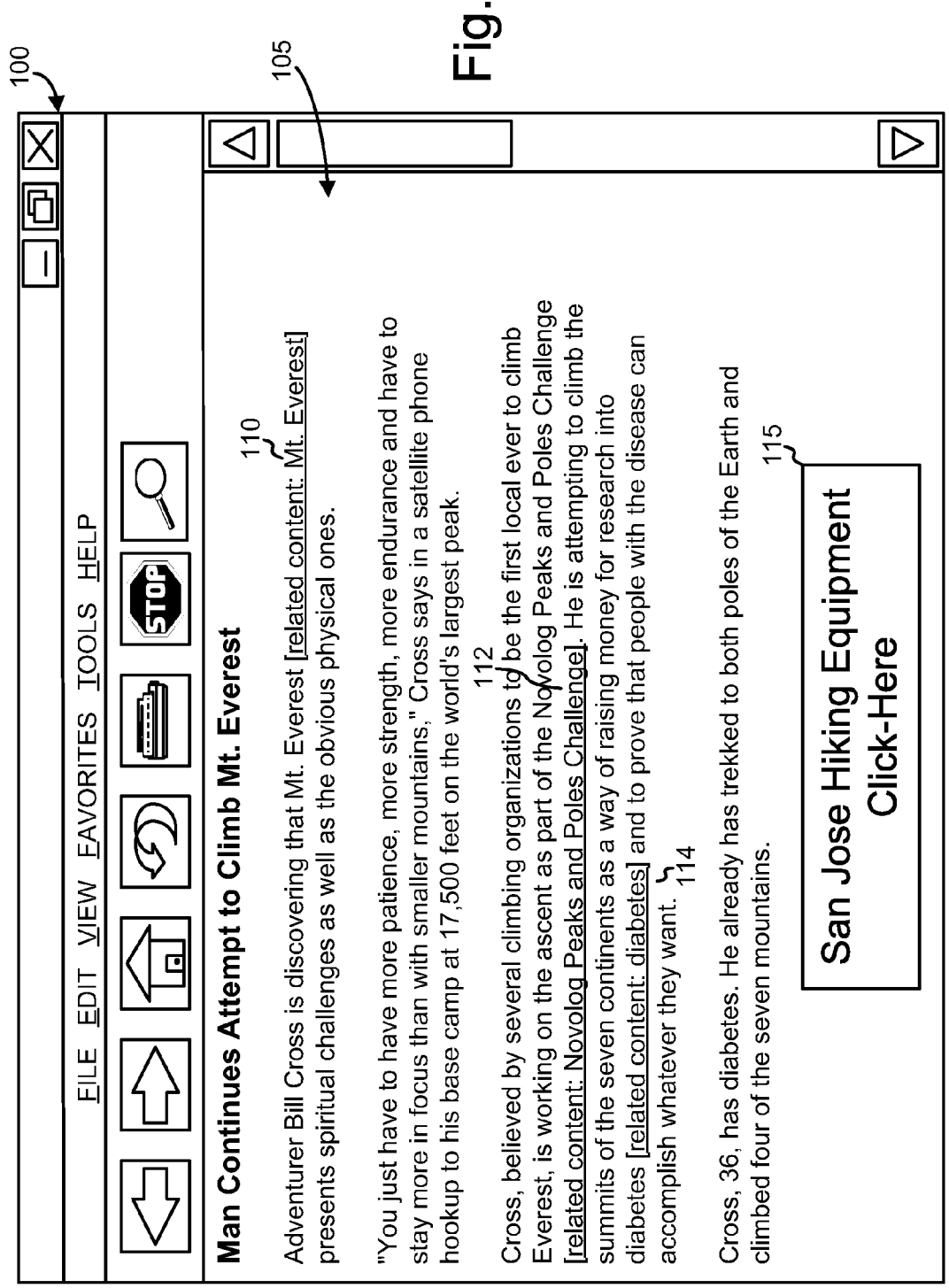
FIGS. 1A and 1B are diagrams illustrating exemplary graphical interfaces that may be presented to a user.
Figure 1B:
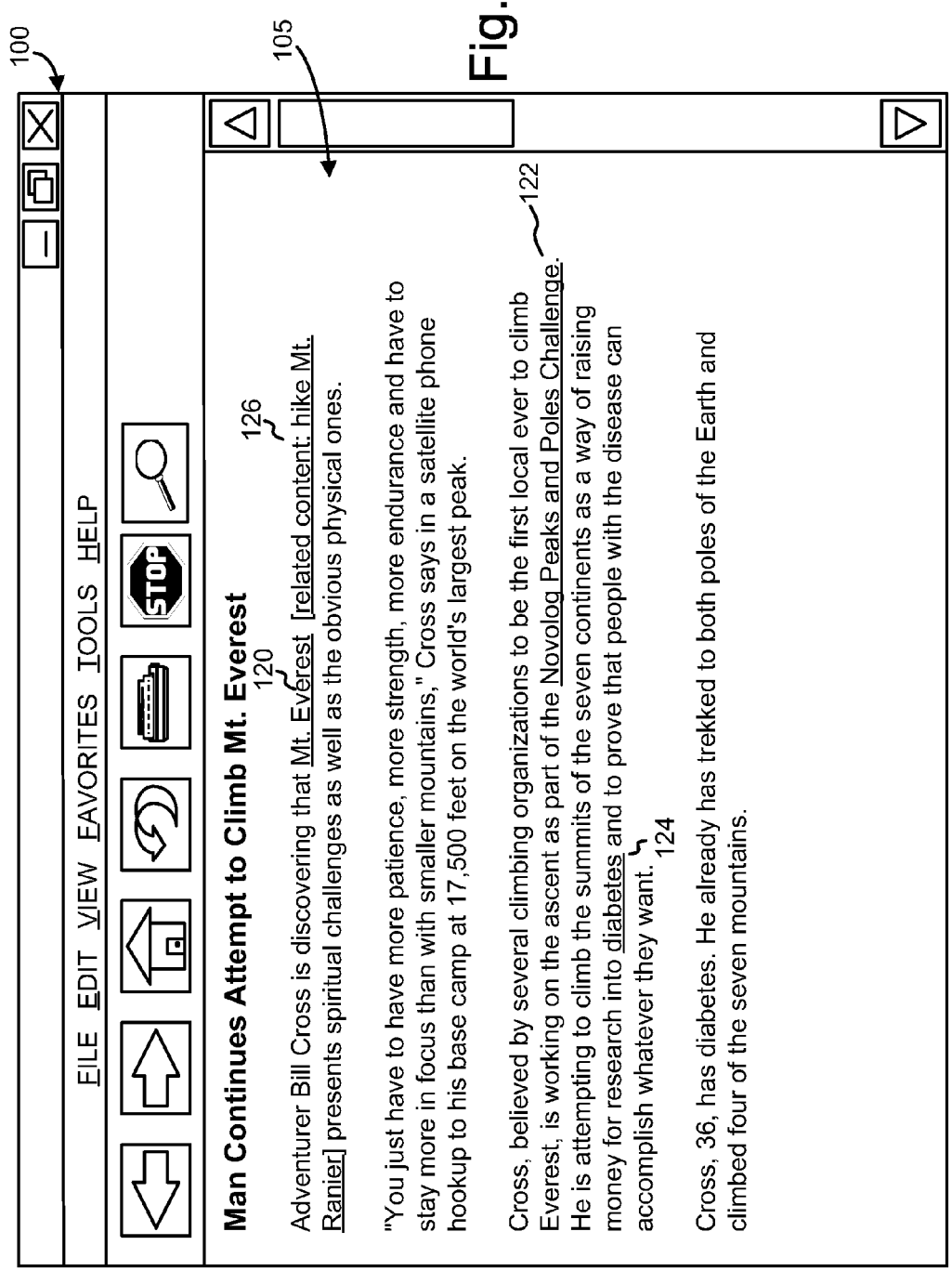

FIGS. 1A and 1B are diagrams illustrating exemplary graphical interfaces that may be presented to a user. The graphical interfaces may be presented via a web browser 100 that is being used to browse the web. The example document 105 shown in FIGS. 1A and 1B relates to a hiker's (Bill Cross) effort to climb Mt. Everest.

A number of additional documents may be relevant to document 105. In FIG. 1A, for example, links to three additional articles 110, 112, and 114 are embedded within document 105. Link 110 may reference a document about Mt. Everest, link 112 may reference a document about the Novolog Peaks and Poles Challenge, and link 114 may reference a document about diabetes. Each of links 110, 112, and 114 reference content that is in someway related to original document 105. In this example, links 110, 112, and 114 are displayed with brief summary text (e.g., "related content: Mt. Everest") that informs the reader of the content of the underlying link. Additionally, the summary text is underlined, indicating that the summary text is associated with a link. Assume that the reader of document 105 in FIG. 1A is located in San Jose, Calif. An advertisement 115 may additionally be displayed for a hiking equipment retailer in San Jose. Additionally, the documents referenced by links 110, 112, and 114 may be documents that are particularly appropriate for a reader in the San Jose area.

Although not shown in FIG. 1A, other links, such as links even more directly customized to the personal information of the reader, may also be displayed. For example, if the reader has previously entered search queries to a search engine, such as photography related search queries, the other links may be links to documents describing "Everest Photography."

Document 105 in FIG. 1B is identical to that in FIG. 1A. Multiple links 120, 122, and 124 are included in document 105 of FIG. 1B. In this example, links 120, 122, and 124, instead of being shown as linked summary text, are implemented by simply modifying the formatting or display associated with certain words or phrases in document 105. For instance, link 120 is shown to the reader by underlining "Mt. Everest," thus illustrating to the reader that the link references a document that pertains to Mt. Everest. Another link 126 is inserted in-line in document 105 that includes summary text similar to links 110,112, and 114. Assume, for this example, that the reader is from Seattle instead of San Jose. Link 126, which may be generated based on this fact, references a document about hiking Mt. Rainer—a mountain near Seattle.

Exemplary Network Overview

Figure 2:
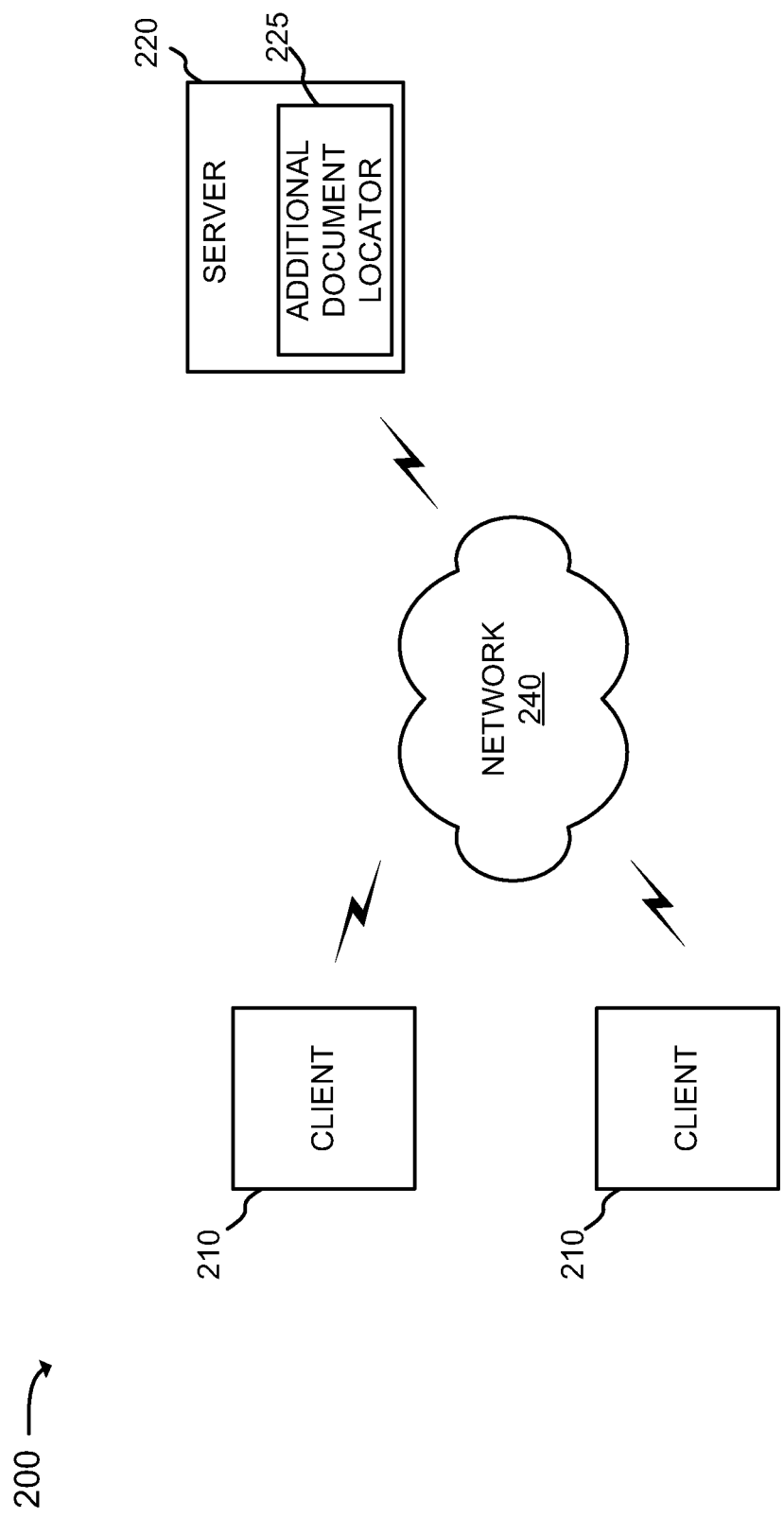
FIG. 2 is an exemplary diagram of a network in which concepts consistent with the principles of the invention may be implemented.

FIG. 2 is an exemplary diagram of a network 200 in which concepts consistent with the principles of the invention may be implemented. Network 200 may include multiple clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform one or more functions of a server and a server may perform one or more functions of a client.

A client 210 may include a device such as a wireless telephone, a personal computer, a personal digital assistant (PDA), a lap top, or another type of computation or communication device, a thread or process running on one of these devices, and/or an object executable by one of these devices. Server 220 may include a server device that processes, searches, and/or maintains documents and images in a manner consistent with the principles of the invention. Clients 210 and server 220 may connect to network 240 via wired, wireless, or optical connections.

Server 220 may include additional document locator component 225 (also called simply "document locator 225" herein). Document locator 225 may locate and add references to other documents related to an input document, such as the references added to document 105 (FIGS. 1A and 1B).

A document, as the term is used herein, is to be broadly interpreted to include any machine-readable and machine-storable work product. A document may be an e-mail, a web log (blog), a file, a combination of files, one or more files with embedded links to other files, a news group posting, etc. In the context of the Internet, a common document is a web page, such as an HTML web page. Web pages often include content and may include embedded information (such as meta information, hyperlinks, etc.) and/or embedded instructions (such as Javascript, etc.). Documents discussed herein generally include embedded images. A "link" as the term is used herein is to be broadly interpreted to include any reference to/from a document from/to another document or another part of the same document.

Exemplary Client/Server Architecture

Figure 3:
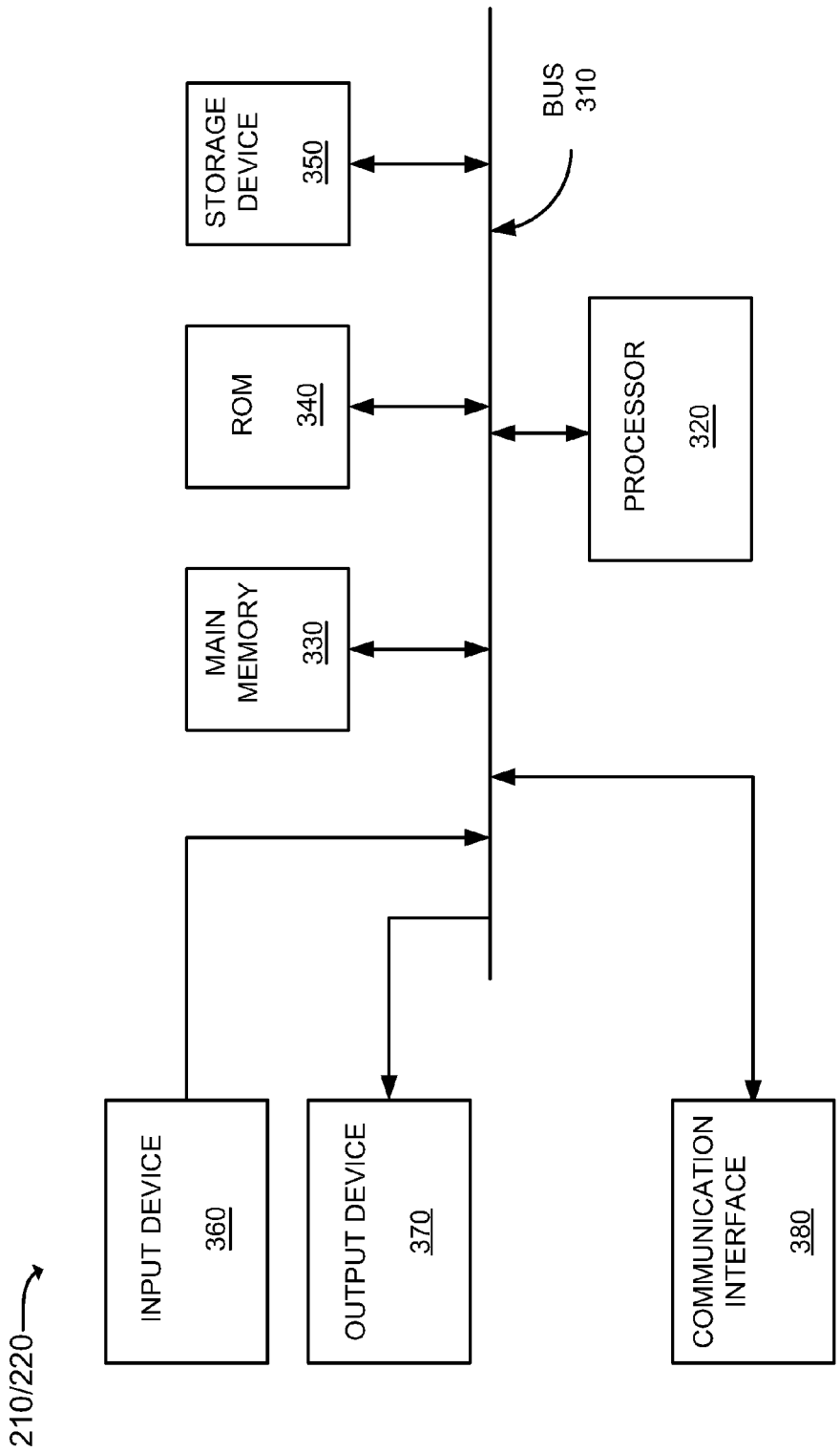
FIG. 3 is an exemplary diagram of a client or server shown in the network of FIG. 2.

FIG. 3 is an exemplary diagram of a client 210 or server 220. Client/server 210/220 may include a bus 310, a processor 320, a main memory 330, a read only memory (ROM) 340, a storage device 350, an input device 360, an output device 370, and a communication interface 380. Bus 310 may include conductors that permit communication among the components of client/server 210/220.

Processor 320 may include conventional processors, microprocessors, or processing logic that interpret and execute instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include one or more conventional mechanisms that permit a user to input information to client/server 210/220, such as a keyboard, a mouse, a pen, voice recognition and/or biometric mechanisms, etc. Output device 370 may include one or more conventional mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

Server 220, consistent with the principles of the invention, may implement additional document locator 225. Additional document locator 225 may be stored in a computer-readable medium, such as memory 330. A computer-readable medium may be defined as one or more physical or logical memory devices and/or carrier waves.

The software instructions defining additional document locator 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software.

Document Locator 225

Figure 4:
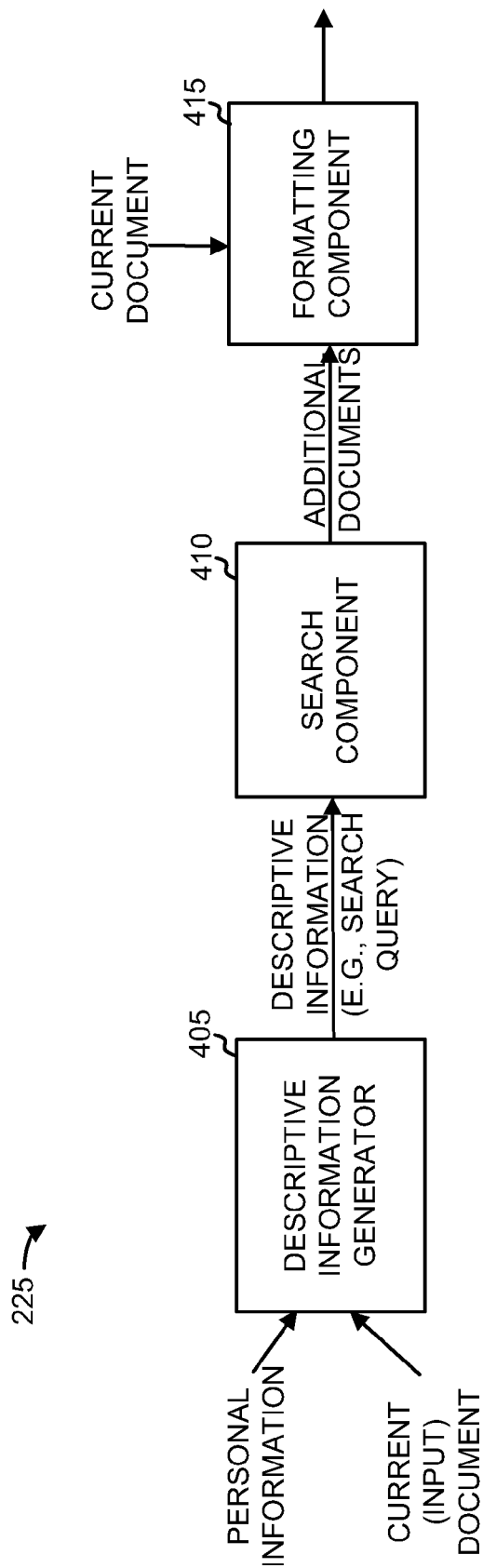
FIG. 4 is a block diagram illustrating conceptual elements of the document locator shown in FIG. 2.

FIG. 4 is a block diagram illustrating conceptual elements of document locator 225. Document locator 225 may include a descriptive information generator 405, search component 410, and formatting component 415. Descriptive information generator 405 may generate descriptive information describing the current document and based on personal information of the user. In one implementation, the descriptive information may include a search query. Descriptive information generator 405 may generate the descriptive information based on the personal information of the user and/or the current input document (or information relating to the current document).

The descriptive information output from descriptive information generator 405 may be input to search component 410, which may use the descriptive information to generate additional documents. Links or other references to the additional documents may be inserted with the original document by formatting component 415.

Descriptive information generator 405, search component 410, and formatting component 415 will each be described in more detail below.

Descriptive Information Generator 405

As mentioned, descriptive information generator 405 may generate descriptive information, such as a search query. The descriptive information may be generally based on information relating to the document the user is currently viewing (or has requested for viewing) as well as personal information of the user. The information relating to the current document may include information based on the text of the current document. The text may be processed to obtain, for example: (1) all terms appearing more than some pre-determined number of times, (2) named entities that can be automatically extracted; (3) dates in the document; (4) author and publication names; and/or keyword or category extraction.

Regarding (1) above, terms appearing more than some pre-determined number of times may be considered to be important or particularly descriptive terms in the document and may be considered to be descriptive information for the document. The number of terms selected to include in the descriptive information may, for example, be limited to a predetermined number of most frequently occurring terms. In a possible variation of this concept, the number of times a term occurs may be considered in conjunction with the general frequency with which the term appears in the language of the document. Thus, terms that tend to occur relatively rarely in a language may be selected before a common term that occurs more times in the document.

A list of predetermined named entities or other nouns may be stored by descriptive information generator 405. For example, location names, celebrity names, names of well known commercial or consumer products, and company names may be pre-generated by either manual (i.e., entered by a human operator) or automatic techniques. As mentioned above, the text of the document can be compared to these named entities and matches included in the descriptive information for the document. Referring to the examples of FIGS. 1A and 1B, the list of predetermined named entities may have included terms such as "Mt. Everest" and "Novolog Peaks and Poles Challenge," causing these terms to be included in the descriptive information for document 105.

Dates in the document (item (3) above), the document author, and publication names (item (4)) may be included in the descriptive information. Such information can often be automatically determined through pattern matching techniques applied to the document. The date of the document may be used to locate other contemporaneously published documents. Similarly, the publishing entity (e.g., web site) and document author may be used to locate documents from the same or similar publications or documents written by the same author. The document date, author, and publication may be particularly useful in the context of news stories. Regarding (5), a document can be analyzed for its keywords, such as keywords extracted based on term frequency or through named entity extraction.

In addition to generating the descriptive information based on the document, descriptive information generator 405 may generate descriptive information based on information specific to the user ("personal information"). The personal information can include, for example, the geographical location of the user (e.g., previous search queries submitted or links selected), personal information provided by the user when registering an account, personal information based on the browsing history of the user, personal information extracted from documents generated by the user, or other sources of personal information. The geographic location of the user may be estimated based on the user's IP address. The personal information can also include temporal information, such as the current date or season. Temporal information can be useful to correlate events with personal preferences or document content. For example, if a document being browsed is about Edinburgh, and the current month is July or August, then related documents about the Edinburgh Arts Festival may be shown.

In one implementation, the personal information can be based on user profiles constructed from previous search queries submitted to a search engine. Category matching techniques can be used to infer user interests from search terms. For example, even if the user never actually enters the search term "photography," but instead queried the terms "Nikon," "aperture," and "f-stop," these terms may be used to infer that the user is interested in photography.

One technique for generating category mappings from search queries is based on gathering a large number of historical user search queries that are labeled based on user search sessions. The rationale is that people that search for a search term such as "Canon" are likely to also, in the same search session, enter other search queries, such as "photography" or "f-stop," that are related to the same category. By analyzing many such search query-sessions, category inferences can be made (e.g., if a person searches for "Nikon" it is likely that they are interested in photography).

Descriptive information generator 405 may format the descriptive information as a search query. In one implementation, the search query may be obtained by concatenating the descriptive information (e.g., the personal information of the user and the document-related descriptive information) to obtain the search query. As an example, consider document 105 in FIG. 1A. Based on an analysis of the document and the personal information of the user, descriptive information generator 405 may generate the descriptive information "Mt. Everest," "Novolog Peaks and Poles Challenge," "diabetes," "San Jose," and "photography." These terms may be combined into a single search query "Mt. Everest Novolog Peaks Poles Challenge diabetes San Jose photography." In other implementations, multiple search queries, each including a subset of terms from the document and the user's personal information, may be generated, such as the search queries: "Mt. Everest San Jose," "hiking San Jose," "photography Mt. Everest," etc.

One of ordinary skill in the art will recognize that other techniques for formulating the search queries from the generated descriptive information can be used. For example, additional information can be used in determining whether to include a term in the query, such as the general frequencies of the occurrence of the term in the language. Additionally, certain names, entities or other predefined terms can be given additional weight in determining whether to include them in the query. Some terms, such as geographic names, can be weighted differently than other terms, such as product names. Product names can be automatically limited by appending their associated company name after the product name. Still additionally, the descriptive information can be used with cluster or category matching techniques, such as those described above, to generate other terms that can be used in the search queries.

Search Component 410

Figure 5:
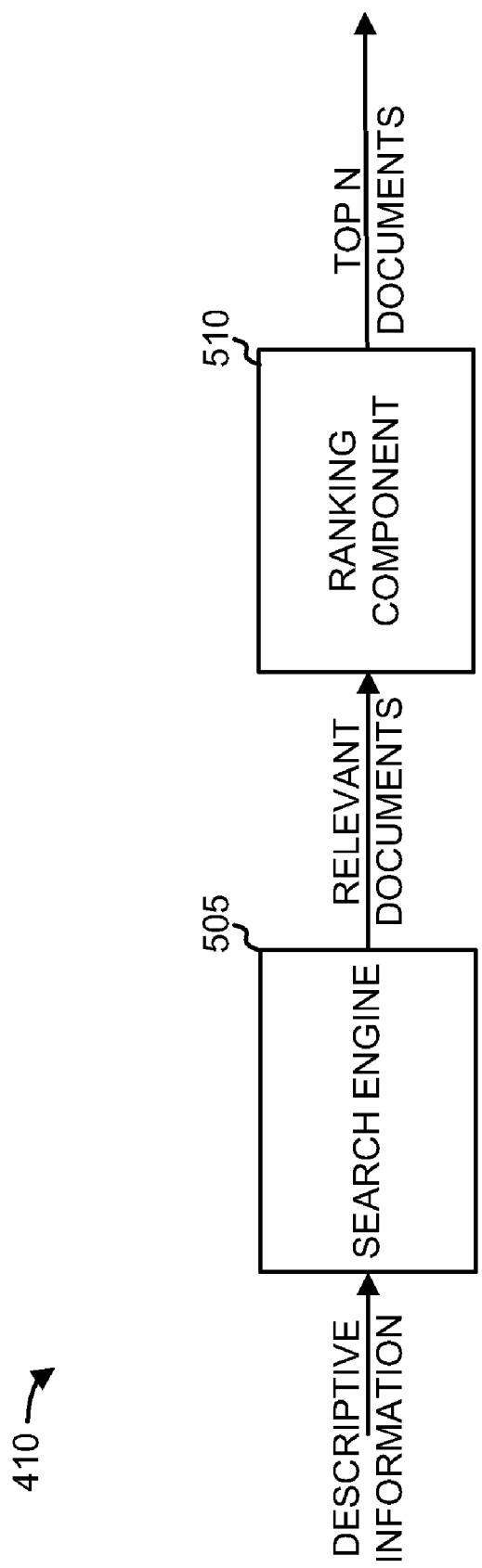
FIG. 5 is a diagram illustrating an exemplary implementation of the search component shown in FIG. 4.

FIG. 5 is a diagram illustrating an exemplary implementation of search component 410 in additional detail. Search component 410 may include a search engine 505 and a ranking component 510.

Search engine 505 may receive the descriptive information from descriptive information generator 405, and in response, locate one or more documents relevant to the descriptive information. Search engine 505 may be a query-based search engine that returns a ranked set of documents related to the input search query. Search engine 505 may be a general search engine, such as one based on all documents from a large collection, such as documents on the web, or a more specialized search engine, such as a news search engine. Techniques for implementing search engines are generally known in the art and will thus not be disclosed further herein.

Ranking component 510 may operate to rank and/or prune the set of documents returned by search engine 505. In one implementation, ranking component 510 may sort the set of returned documents based on a query match score that defines how well each document in the set of returned documents matches the search query. Documents that are a "better" match to the search query, such as documents that include multiple instances of terms in the search query, will tend to have higher relevance scores than documents that are not matched as well. Ranking component 510 may also sort the documents based on other measures of relevance or quality, such as based on a link-based measurement of document quality. The top N sorted documents (e.g., N=3) may selected by ranking component 510 for presentation to a user.

Other techniques for ranking or pruning the set of relevant documents may be used by ranking component 510. For example, documents may be selected that appear in multiple document sets corresponding to multiple related search queries, documents may be selected as those that are most recent, documents may be selected as those that are the most popular (e.g., based on the number of times the document link was selected). As other examples, documents from commercial sites may be explicitly excluded (or included).

In some implementations, multiple potential search queries can be received corresponding to the descriptive information, and the queries that return the "best" results can be used. The "best" results can be measured in a number of ways, such as by looking at objective ranking values corresponding to documents returned from a search engine in response to the potential search query. In addition, multiple different search engines could be used, such as a news search engine, a product search engine, or a general web-based search engine.

Formatting Component 415

Formatting component 415 may incorporate the additional documents located by search component 410 into the current document (i.e., the document currently being viewed by the user) or into a new document that includes the current document. The additional documents may be incorporated with the current document in a manner that informs the user that the documents are available without being overly disruptive to the user's reading of the current document.

In one implementation, formatting component 415 may insert links (e.g., hyperlinks) into the additional documents in-line with the text of the current document. When possible, the link to each additional document may be inserted in a section in the current document that is particularly relevant to the additional document. This concept is illustrated in FIGS. 1A and 1B, in which links to related content, such as a link to a document about Mt. Everest, is inserted near the term "Mt. Everest" in document 105. Although links in FIGS. 1A and 1B are shown as including parenthetical summary information and as links that are identified by modifying the display of words in the current input document, other techniques for graphically displaying the links can be used.

Techniques other than in-line hyperlinks may be used to embed the additional documents into the current document. For example, "float-over" text may be used that appears when the user positions the cursor over a particular word, image, or other object in the current document.

Operation of Document Locator 225

Figure 6:
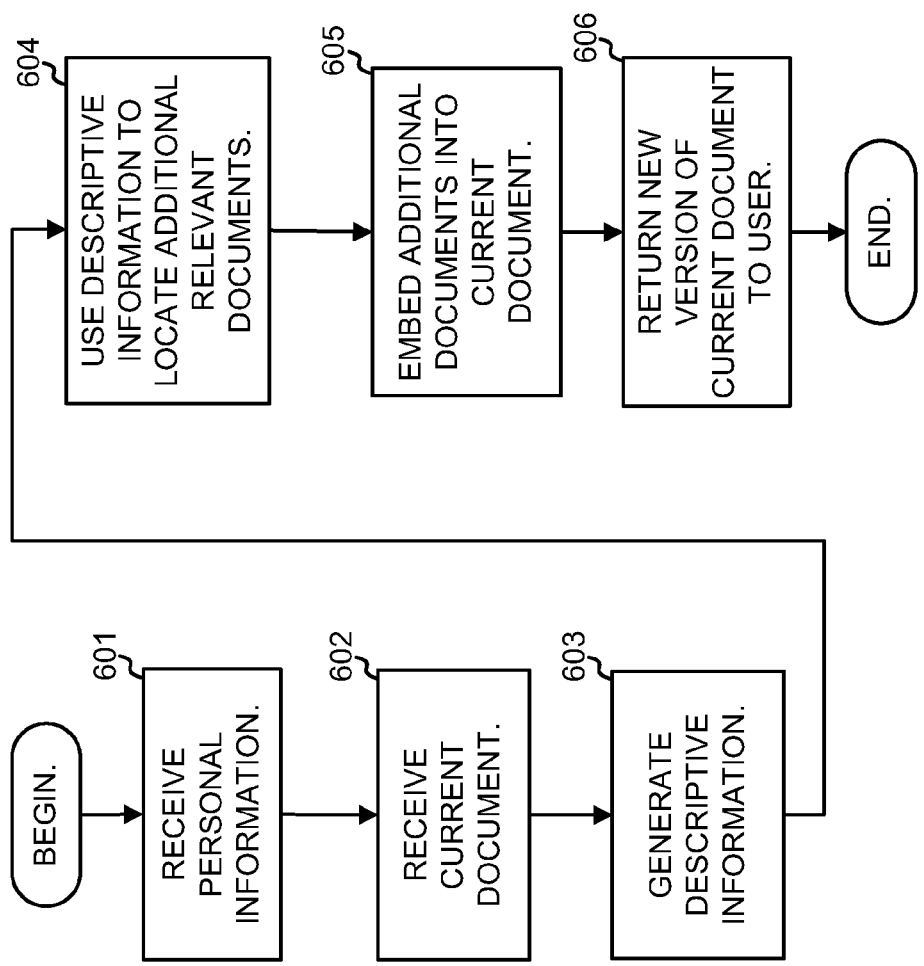
FIG. 6 is an flowchart illustrating exemplary operations performed by the document locator shown in FIG. 2.

FIG. 6 is an flowchart illustrating exemplary operations performed by document locator 225. Document locator 225 may begin operation in response to a user requesting a document, such as a request made from a web site or a search engine.

Document locator 225 may receive or locate personal information of the user (act 601). The personal information can include information such as, for example, the geographic location of the user, personal information provided by the user when registering an account (or at another time), personal information based on the browsing history of the user, or personal information extracted from documents generated by the user. Document locator also receives the current input document that the user is requesting (act 602).

Descriptive information relating to the input document may be generated (act 603). The descriptive information may, as previously discussed, be generated by descriptive information generator 405 and may include a search query that contains terms related to the current input document and the personal information of the user. The descriptive information may be used to locate additional relevant documents (act 604). As discussed, this may be performed by search component 410 submitting a search query to a search engine.

One or more of the additional relevant documents may be embedded or otherwise associated with the current input document (act 605). As shown in FIGS. 1A and 1B, the additional relevant documents may be embedded in-line with the current input document. The modified version of the current input document, including the links to the additional relevant documents, may then be presented to the user (act 606).

Exemplary Implementation of Document Locator 225

Figure 7:
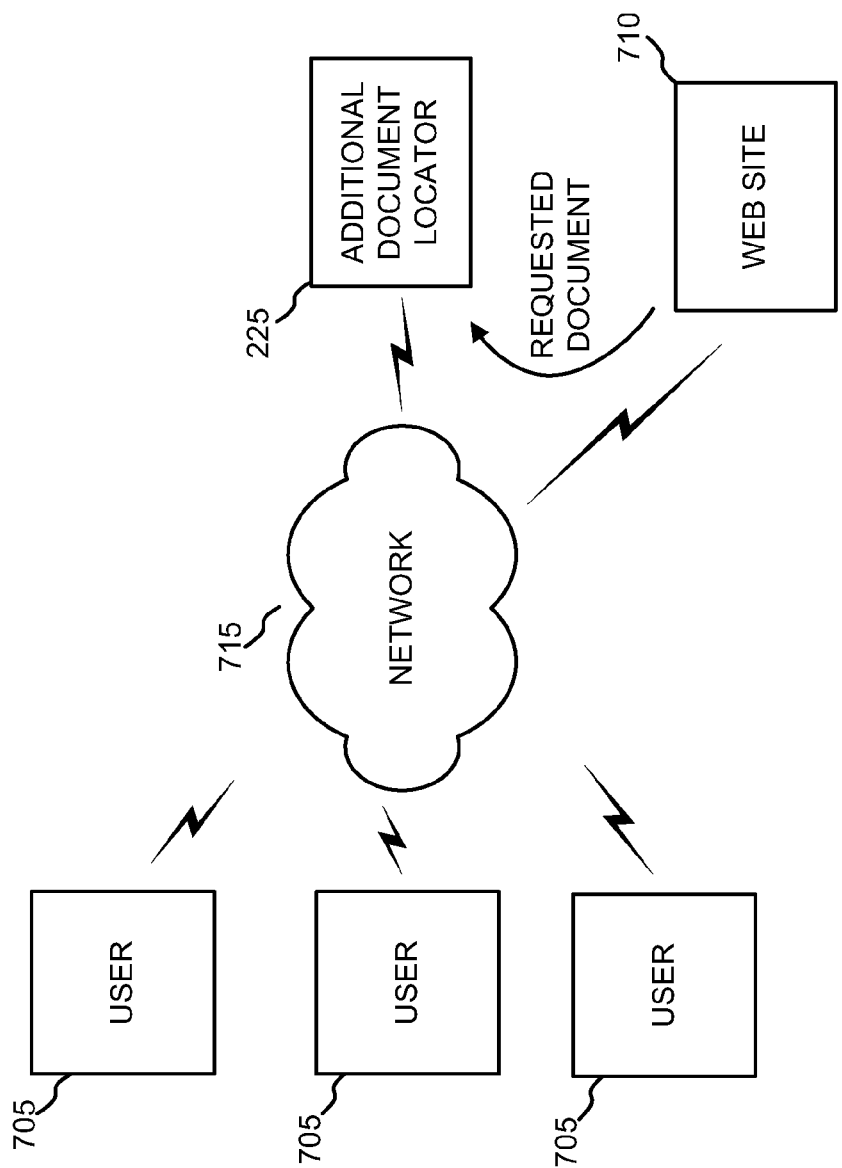
FIG. 7 is a diagram illustrating an exemplary implementation of the document locator in the context of a content serving web site.

FIG. 7 is a diagram illustrating an exemplary implementation of additional document locator 225 implemented in the context of a content serving web site, such as a web site devoted to articles about a particular hobby (e.g., automobiles). One of ordinary skill in the art will appreciate that document locator 225 could be implemented in a number of additional networked environments, such as in the general context of a news search engine or a more general search engine.

A number of users 705 may connect to content web site 710 over a network 715. The users may request particular documents from content web site 710. Before returning the requested document to the user, web site 710 may transmit the document (or information identifying the document), potentially along with personal information of the requesting user, to document locator 225. Document locator 225 may return its modified version of the requested document, as previously discussed, to web site 710, which may then forward the document to the user. In this manner, documents from web site 710 may be auto-augmented to enhance their desirability before returning them to the user.

Many variations on this example are possible. For instance, instead of document locator 225 returning the enhanced document to web site 710, web site 710 may simply redirect the user's document request to document locator 225, which may then return the enhanced document to the user.

CONCLUSION

Techniques for automatically locating additional documents relevant to an original document and/or to personal information of a user, such as a document being read by a user, were described herein. In one implementation, the additional documents were located based on personal information of the user as well as being based on content relevant to the document being read by the user. The additional documents can be presented in-line with the document being read, such as via links inserted at locations in the document that are particularly relevant to the additional document. The user can thus be efficiently presented with additional information that is relevant to the original document being read.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed:

1. A method performed by a computer system, the method comprising:
   receiving, using a communication interface associated with the computer system, a request for a first web page, from a user of a client device;
   receiving, using a communication interface associated with the computer system, personal information relating to the user;
   obtaining, using one or more processors associated with the computer system, the first web page;
   identifying, using one or more processors associated with the computer system, a word or phrase within text of the first web page;
   forming, using one or more processors associated with the computer system, a search query based on the identified word or phrase and one or more terms associated with the personal information;
   identifying, using one or more processors associated with the computer system, a second web page based on a search performed by a search engine using the search query;
   inserting, using one or more processors associated with the computer system, a reference to the second web page into the first web page to form a modified first web page; and
   providing, using one or more processors associated with the computer system, the modified first web page to the client device.

2. The method of claim 1, where the personal information includes at least one of a plurality of types of personal information, including geographic location of the user, information provided by the user when registering an account, or information based on a browsing history of the user.

3. The method of claim 1, where forming the search query further comprises forming multiple search queries by combining the identified word or phrase with each of a plurality of terms derived from the personal information.

4. The method of claim 1, where inserting the reference to the second web page includes embedding the reference to the second web page into the first web page in-line with the identified word or phrase to form the modified first web page.

5. The method of claim 4, where providing the modified first web page includes transmitting, via a network, the modified first web page directly to the client device.

6. The method of claim 1, where obtaining the first web page comprises receiving the first web page from a web server, the method further comprising:
   transmitting the modified first web page to the web server.

7. A system comprising:
   one or more devices to:
   receive, from a user, a request for a first web page;
   obtain the first web page;
   identify a word or phrase in the first web page based on a number of times that the word or phrase occurs in the first web page and a frequency with which the word or phrase occurs in a language of the first web page;
   determine one or more terms based on personal information relating to the user;
   form a search query based on the identified word or phrase and the one or more terms;
   identify a second web page based on a search performed by a search engine using the search query;
   insert a reference to the second web page within the first web page to form a modified first web page; and
   output the modified first web page.

8. The system of claim 7, where, when inserting the reference to the second web page, the one or more devices are further to:
   embed the reference to the second web page into the first web page in-line with the identified word or phrase.

9. The system of claim 8, where, when outputting the modified first web page, the one or more devices are further to:
   transmit the modified first web page to the user.

10. The system of claim 7, where the one or more devices are further to:
    store the personal information relating to the user;
    determine the one or more terms based on the stored personal information;
    form a plurality of additional search queries by combining each of the one or more terms with the identified word or phrase; and
    perform a plurality of searches, using the plurality of additional search queries, to identify a plurality of web pages, the plurality of web pages including the second web page.

11. The system of claim 7, where the personal information includes at least one of a geographical location of the user, information provided by the user when registering an account, or information based on a browsing history of the user.

12. A device comprising:
a memory containing programming instructions; and
a processor, coupled to the memory, to execute the programming instructions to:
receive personal information relating to a user,
receive a first web page requested by the user,
identify one or more terms in the first web page,
locate at least one second web page by submitting a plurality of different search queries to a search engine, each of the plurality of different search queries including a different combination of terms from the one or more terms in the first web page and terms based on the personal information relating to the user;
insert a reference to the at least one second web page within the first web page to form a modified first web page, the modified first web page including the content of the first web page modified to include at least one link, embedded in-line with the first web page, that references the at least one second web page, the at least one link being located in-line near one of the one or more terms; and
output the modified first web page.

13. The device of claim 12, where the personal information includes at least one of a geographic location of the user, information provided by the user when registering an account, or information based on a browsing history of the user.

14. The device of claim 12, where the processor is to execute the programming instructions further to:
transmit the modified first web page to the user via a network.

15. The device of claim 12, where the personal information includes a plurality of different types of information and each of the plurality of different search queries includes a different combination of terms from the one or more terms in the first web page and terms based on each of the different types of information and combinations of the different types of information.

16. A non-transitory computer-readable storage medium comprising:
one or more instructions which, when executed by at least one processor, cause the at least one processor to:
receive personal information relating to a user;
identify terms in a first document;
generate a plurality of different search queries based on the terms and the personal information;
locate sets of documents by submitting the plurality of different search queries to a search engine;
select a particular document based on whether the particular document occurs in multiple ones of the sets of documents; and
insert a reference to the particular document in the first document to form a modified first document, the modified first document including content of the first document modified to include a link, embedded in-line with the first document, that references the particular document, the link being located in-line near one of the terms.

17. The medium of claim 16, where the personal information includes at least one of a geographic location of the user, information provided by the user when registering an account, or information based on a browsing history of the user.

18. The medium of claim 16,
further comprising:
one or more instructions to transmit the modified first document to the user via a network.

19. The medium of claim 16, where the personal information includes a plurality of different types of information and each of the plurality of different search queries includes a different combination of terms from the terms in the first document and terms based on each of the different types of information and combinations of the different types of information.

20. The medium of claim 16, where the link includes float-over text.

* * * * *